United States Patent

Zlotnick

[11] Patent Number: 5,949,053
[45] Date of Patent: Sep. 7, 1999

[54] OPTIMIZED TECHNIQUE FOR DECODING A BAR CODE FROM AN IMAGE OF AN ARRAY OF PIXELS

[75] Inventor: Aviad Zlotnick, Mitzpe Netofa, Israel

[73] Assignee: International Business Machines Corporation, Armonk, N.Y.

[21] Appl. No.: 08/860,139

[22] PCT Filed: May 11, 1995

[86] PCT No.: PCT/GB95/01073

§ 371 Date: Aug. 27, 1997

§ 102(e) Date: Aug. 27, 1997

[87] PCT Pub. No.: WO96/18971

PCT Pub. Date: Jun. 20, 1996

[30] Foreign Application Priority Data

Dec. 13, 1994 [GB] United Kingdom .................. 9425143

[51] Int. Cl.[6] .................................................. G06K 7/10
[52] U.S. Cl. .................. 235/462.09; 235/462.01
[58] Field of Search ................. 235/462.01, 462.04, 235/462.08, 462.09, 462.1, 462.11, 462.15, 462.16, 462.41, 494

[56] References Cited

U.S. PATENT DOCUMENTS

| | | | |
|---|---|---|---|
| 4,675,909 | 6/1987 | Egami et al. | 382/50 |
| 4,916,298 | 4/1990 | Raphael | 235/462.1 |
| 5,073,954 | 12/1991 | Van Tyne et al. | 382/18 |
| 5,276,315 | 1/1994 | Surka | 235/462.1 |
| 5,357,093 | 10/1994 | Netter et al. | 235/462.08 |
| 5,635,699 | 6/1997 | Cherry et al. | 235/462.41 |

*Primary Examiner*—Donald Hajec
*Assistant Examiner*—Diane I. Lee
*Attorney, Agent, or Firm*—K. O. Hesse

[57] ABSTRACT

A technique for decoding a barcode from an image of the barcode in the form of an array of pixels stored in digital form by determining a series of bar start and bar end locations from the image. An optimization technique is used to select the bar start and bar end locations for the series by finding an extremum in a predefined target function. The target function is a function of the number of rows of pixels in the image in which runs of black or white pixels start or end at particular locations in the rows.

14 Claims, 2 Drawing Sheets

X = (1,2,4,4,7,10,12,15,19,20)
NS = (15,0,0,7,1,0,11,0,1,4,0,15,0,0,2,0,0,3,9,4)
NE = (4,11,0,7,1,0,4,1,0,15,0,3,3,3,9,0,0,2,0,15)

X = (1,2,4,4,7,10,12,15,19,20)
NS = (15,0,0,7,1,0,11,0,1,4,0,15,0,0,2,0,0,3,9,4)
NE = (4,11,0,7,1,0,4,1,0,15,0,3,3,3,9,0,0,2,0,15)

US 5,949,053

OPTIMIZED TECHNIQUE FOR DECODING A BAR CODE FROM AN IMAGE OF AN ARRAY OF PIXELS

FIELD OF THE INVENTION

The invention relates to improvements in barcode decoding, and more particularly, to the decoding of barcodes from pixel-based images.

DESCRIPTION OF RELATED ART

Barcodes are very widely used nowadays to associate coded information with a wide variety of objects, such as items for sale in shops, letters and parcels during the postal sorting process and manufactured goods both during the manufacturing process itself and in distribution. The advantage of barcodes is that they lend themselves particularly well to automated optical reading.

The decoding of optically-sensed barcodes is a mature technology and performance near 100% can be achieved using high quality barcode labels and laser scanning technology.

However, in practice many barcode labels are poorly printed, or physically damaged in the course of handling, which leads to a degradation in the decoding process.

Furthermore, many modern applications of barcode technology require barcodes to be identified from pixel-based images generated by, for instance, CCD (Charge Coupled Device) cameras. Such cameras have a lower resolution than the laser scanners conventionally used for barcode sensing. This, coupled with the fact that the spatial resolution of a captured image decreases as the speed of objects passing an image capture station increases, leads to the continued need for improvements to the decoding of barcodes from low resolution and possibly corrupted pixel-based images.

The problem of decoding barcodes from pixel-based images has generally been addressed in two ways in the prior art. Some prior art techniques concentrate on the repeated attempts to decode single reference lines through such images, relying on checksum data or inherent self-checking properties of the barcode definitions to highlight errors, when one line fails, another is tried. An example of such a technique is described in U.S. Pat. No. 5,343,028. These techniques have the drawback that in many cases there may not be a single line in the image which is correct and therefore in these cases it is not possible to decode the barcode.

Other prior art techniques sum or average the pixel values in a number of columns of the image and process the result as if it were a single grey scale scan line. Examples of these techniques can be found in EP-A-315515 in which a recursive technique is used to determine a threshold in order to identify the edges of the bars and in U.S. Pat. No. 5,276,315 in which the image is divided horizontally into a plurality of two-dimensional sections and an intensity value is assigned to each section by calculating the average intensity of all the pixels in that section, thereby forming a vertical projection of the image.

The major drawback with these known techniques is that some of the information in individual lines is lost in the summing or averaging process. These techniques are also very sensitive to spatial distortions in the source images.

SUMMARY OF THE INVENTION

This invention is directed to providing an improved technique for decoding a low-resolution pixel-based barcode image.

To achieve this, the invention provides apparatus for producing a coded representation of a barcode, for use in barcode recognition, from an image of the barcode in the form of an array comprising rows and columns of pixels stored in digital form by determining a series of bar start and bar end locations from the image, characterized by: means for determining for each column of pixels in said image the number of rows of pixels in the image in which runs of black or white pixels start or end at said column; and optimization logic for selecting the bar start and bar end locations for the series by finding an extremum in a predefined target function, the target function being a function of said number of rows of pixels in the image in which runs of black or white pixels start or end at each column, thereby optimizing the agreement on the location of the bar starts and ends between all of the rows in the image.

The use of a target function which takes into account the numbers of rows in the image in which bars start or end at particular locations has been found to provide a much more sensitive test for the presence or absence of a bar because correlations between bar starts and ends in different lines are taken into account. In this way, even the slightest remnants of the correct barcode are used in the optimization process, whereas in combining rows by summing or averaging, as in the prior art, such clues are almost always covered by the noise.

Preferably, the efficiency of the optimization is improved by making use of prior Knowledge of the barcode definition. This is achieved by ensuring that the optimization logic is arranged only to test combinations of start and end locations which are consistent with a predefined barcode definition.

This provides a convenient way in which known properties of the barcode, such as the total number of bars and spaces and the maximum and minimum bar width can be taken into account.

In a preferred embodiment this is achieved by the optimization logic being arranged to find the best path between nodes, the nodes being pairs: <pixel__location x, symbol__relative__location srl> and wherein paths can be extended from a node <l1,s1> only to nodes <l2,s2> such that l2−l1 is greater than or equal to the minimum bar length and l2−l1 is less than or equal to the maximum bar length and s2 is equal to (s1+1) mod N, where N is the number of bar/space elements per symbol in a prevailing barcode definition and srl is the location of a bar or a space relative to the start of a symbol, measured in the number of bar/space elements. Using this arrangement, the optimization logic can be arranged to operate according to a dynamic programming algorithm.

Advantageously, the target function can include a term for reducing the target function in accordance with the distance between a postulated location for a symbol start or end and the pixel position at which the symbol start or end would be expected on the basis of a prevailing barcode definition. This enables the algorithm to be flexible with respect to local stretching or shrinking of the barcode image, as well as imprecision in calculating the number of pixels per symbol.

Viewed from another aspect the invention provides a method for producing a coded representation of a barcode from an image of the barcode in the form of an array of pixels stored in digital form, the method comprising determining a series of bar start and bar end row locations from the image, characterized in that the determination step comprises: determining for each column of pixels in said image the number of rows of pixels in the image in which runs of black or white pixels start or end at said column; and selecting the bar start and bar end locations for the series by finding an extremum in a predefined target function, the target function being a function of said number of rows of pixels in the image in which runs of black or white pixels start or end at each column, thereby optimizing the agreement on the location of the bar starts and ends between all of the rows in the image.

DESCRIPTION OF THE PREFERRED EMBODIMENT

Figure 1:
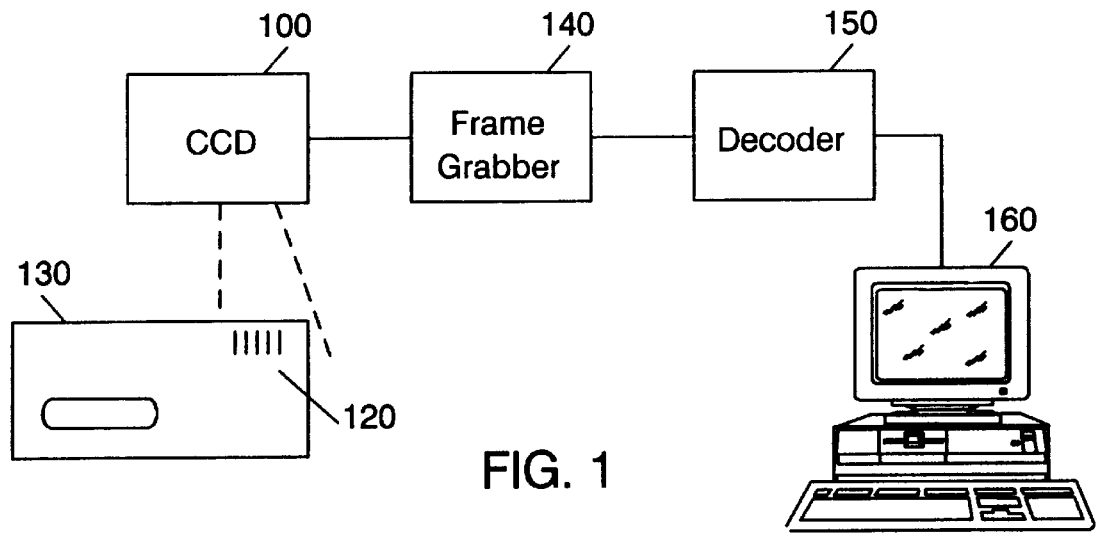
FIG. 1 shows barcode capture and recognition apparatus.

Referring to FIG. 1, barcode image capture and recognition apparatus comprises a CCD camera 100, which is arranged to produce an analog video signal representing an image of a barcode 120 printed on a mail item 130. The video signal can be of known standard format and is passed to a frame grabber 140. Frame grabber 140 is arranged to extract from the video signal a greyscale pixel-based image of the bar code in a suitable standard digital format for decoding. The digital image is passed to a decoder 150 which processes the image and recognizes the barcode and passes a code representing the barcode to computer workstation 160 for processing. In an application to mail handling, this processing could include, for example, the control of a mail sorting machine to direct the mail item 130 to a specified destination.

The operation of CCD camera 100 and frame grabber 140 is conventional and well known to those skilled in the art and, consequently, will not be further described herein.

Figure 2:
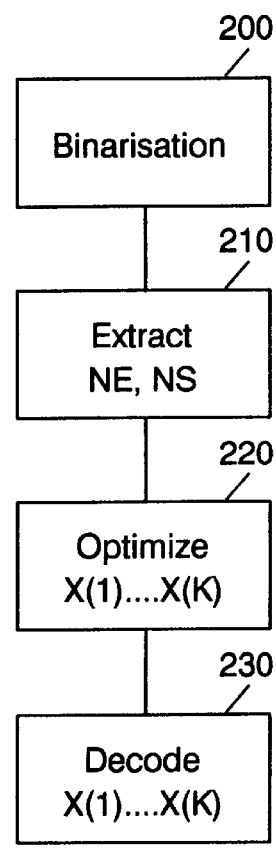
FIG. 2 illustrates a barcode image decoding process.

FIG. 2 illustrates the decoding process which is performed by decoder 150.

First, the greyscale image received from frame grabber 140 is converted into binary form, in which each pixel is classified as either black or white, in step 200. This process is known as binarisation and involves the generation of a bi-level image from a greyscale image. In a simple example, the greyscale value could simply be compared with a threshold value to classify the pixel as black or white. Many methods are known for performing the binarisation task and therefore this step will not be further described herein. of course, it is not excluded that one of the many known scaling and/or image registration techniques be used to transform the barcode image to a required size, orientation and/or resolution.

In this description, the words black and white are used for clarity to distinguish the two different logical states which each pixel may have. Of course, it will be appreciated that this may not necessarily relate to the actual color of the pixel when printed or viewed.

The bi-level image is then processed to extract, in step 210, two vectors, NE and NS, each of which comprise one element for each column of the image. NS(x) is the number of rows in the image in which a bar, in other words a continuous run of black pixels, starts at position x. Similarly NE(x) is the number of rows in the image in which a run of black pixels ends at position x.

Figure 3A:
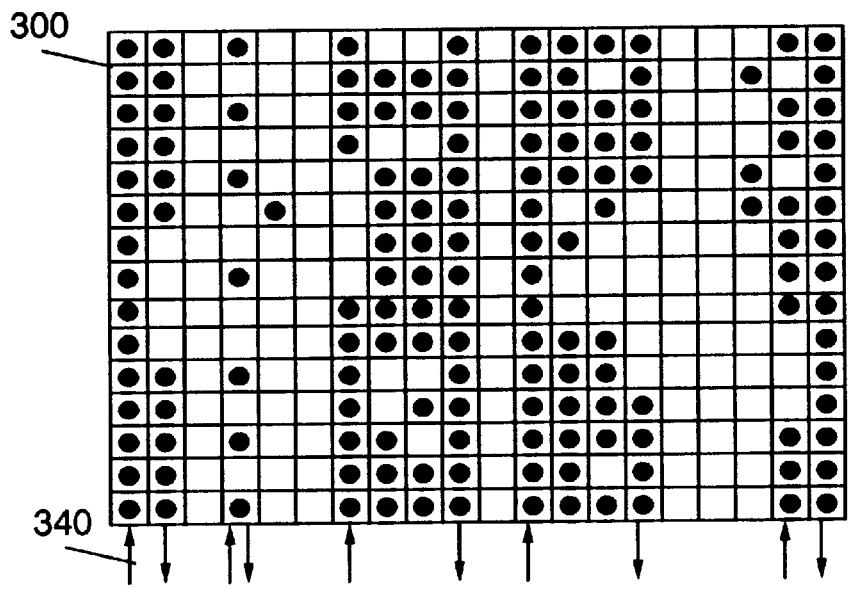
FIG. 3 is a schematic diagram illustrating an example of a pixel-based barcode image and data derived therefrom.
Figure 3B:
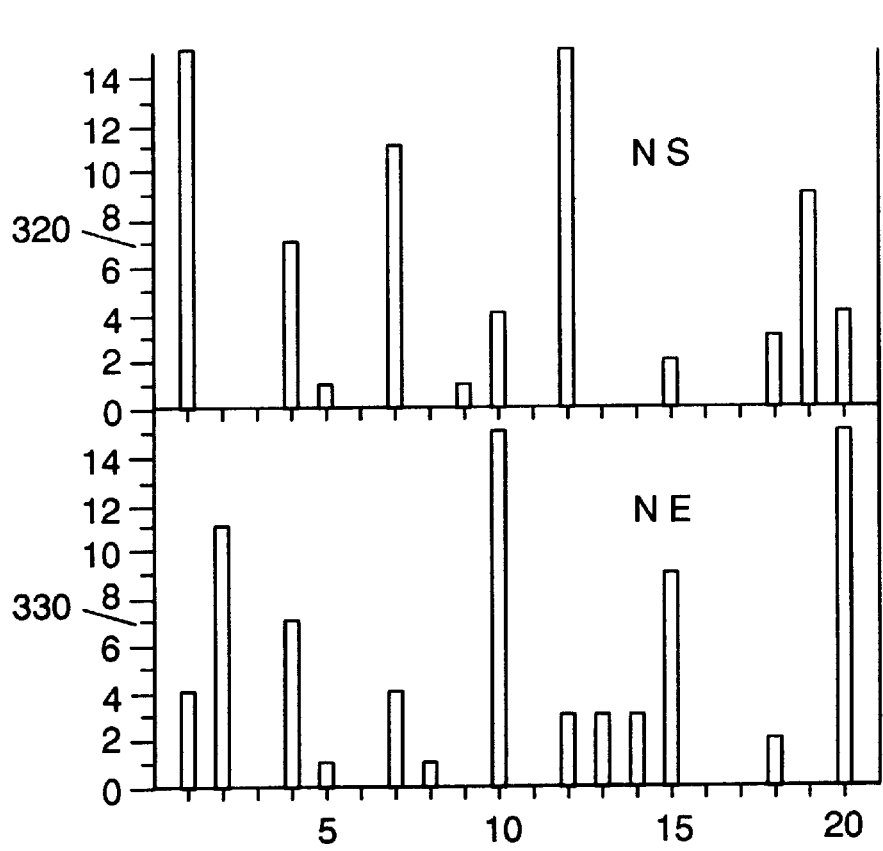

FIG. 3 illustrates the form of the NE and NS with a simple example. Shown in FIG. 3 is a schematic representation of a simple bi-level corrupted bar code image 300. Vectors NS and NE are illustrated in graphs 320 and 330 respectively along with the numerical values of the vectors for this simple example.

The decoding process continues at step 220 by employing a dynamic programming optimization procedure to find a vector X(i), i=1,K, where the X(i)'s are the bar beginnings and ends such that there is maximal agreement on the location of the bar beginnings and ends between all the rows and that the bar beginnings and ends are consistent with a prevailing barcode definition. The bar code definition will typically specify the maximum and minimum bar lengths and the number of bars and spaces in any symbol. This predefined information is used to constrain the optimization task so that x(i)–X(i–1) lies between the maximum and minimum bar lengths and to define the number of elements sought, K.

In the example shown in FIG. 3, K=10 and the vector X has the values shown which correspond to upward and downward arrows 340, representing the beginnings and ends of bars respectively.

Dynamic programming is an optimization technique for finding the best path between two points or nodes, denoted for the sake of example S for source and D for destination, in a graph based on a target function or cost matrix which calculates a cost associated with the possible paths. The aim of the exercise is generally to find the path with the minimal cost using as many steps as are required. A general description of Dynamic Programming techniques can be found in 'Dynamic Programming' by D J White, (Oliver and Boyd 1969).

While dynamic programming provides a particularly fast and efficient optimization technique for this application, it is not excluded that other known optimization techniques, such as simulated annealing or genetic techniques, be used to find the optimal sequence of bar starts and ends from NS and NE instead.

The underlying principle of dynamic programming is that if the optimal path from S to D passes through a node M anywhere in between, then the sub-path from S to M is optimal, and the sub-path from M to D is also optimal. This principle leads to an algorithm of the following general form:

A. Possible path construction
1) Set the initial number of steps of path L to 1.
2) Find the optimal paths to all nodes that can be reached from S in L steps. This is done by extending by one step the paths to the nodes that were reached from S in optimal paths of L–1 steps.
3) If no more paths can be extended, go to step (5).
4) If there were paths which could be extended, set L to L+1, and go back to step (2).

B. Best Path Selection
5) Set the current node to D (the destination), and set the optimal path to empty.
6) Append the current node to the optimal path.
7) If the current node is S (the source), stop.
8) If the current node is not S, set the current node to be the node whose path was extended to become the optimal path to the current node.
9) Go to step 6.

In general bars in barcodes are grouped into symbols. For example, the well known Code 128 has 107 symbols and Code 39 has 44. The symbol width is constant across the barcode. In the following the term symbol relative location or SRL will be used to refer to the location of an element (a bar or a space) relative to the start of a symbol, measured in bar/space elements. Therefore, in a code with N elements per symbol, the SRL values range from 0 to N–1.

In this embodiment, the nodes are pairs:
<pixel_location x, symbol_relative_location srl> Paths can be extended from a node <l1,s1> only to nodes <l2,s2> such that l2−l1 is greater than or equal to the minimum bar length and l2−l1 is less than or equal to the maximum bar length and s2 is equal to (s1+1) mod N. This defines the arcs in the graph.

The quality of the paths between the nodes is calculated from their contribution to a target function. The dynamic programming optimization procedure in this embodiment employs a target function of the following form:

$$S = \sum_{i=2,step2}^{K} \{(NS(X(i-1))NE(X(i)) + NE(X(i))NS(X(i+1))) - (Penalty(X(i)) + Penalty(X(i+1)))\}$$

where Penalty(x) is a function used to reduce the target function in accordance with the distance between a postulated location for a symbol start or end and the pixel position at which the symbol start or end would be expected on the basis of the number of pixels per symbol and the SRL. This enables the algorithm to be flexible with respect to local stretching or shrinking of the barcode, as well as imprecision in calculating the number of pixels per symbol.

It will be appreciated that other target functions could equally be used to identify the bar beginnings and ends from NS and NE. For example, the products of elements of NS and NE could equally be replaced by the minimum of the respective elements of NS and NE, which could improve speed in some circumstances.

The optimization procedure will now be described in detail. It is assumed in this example that a barcode image is made up of one or more symbols, each of which is known to span a known number of pixels in each row. The word element is used to refer to a bar or a space, N represents the number of elements per barcode symbol and K the number of elements per barcode.

For example, code 128 encoding requires 3 bars and 3 spaces for every symbol, with one additional bar at the end of the barcode, and each symbol is of constant width. N is therefore equal to 6 for this code, and for a string of X symbols, K is equal to N*X+1. From the known resolution of the image capture process, it is possible to determine the number of pixels spanned by each symbol.

The following values are also defined:

NEXT_SRL(i)=(i+1)modN

PREV_SRL(i)=(i+N−1)modN

First a series of dynamic programming scores are calculated as follows. Three arrays are used: Score(x,i) is the calculated score at position x, assuming it has an SRL of i; Source(x,i) is the previous bar start or end assuming there is an end or start at position x with SRL i; Start(x,i) is the location of the beginning of the symbol that x is in, assuming x has an SRL of i.

1. For s from 0 to the pixel width of the image the following steps are repeated:
2. For e from s + min_bar_length to s + max_bar_length, the following steps are repeated:
3. For srl from 0 to N−1 the following steps are repeated:
4.     if srl = 0, set start(s,srl) = s;
5.     if srl is even set next_score = score(s,srl) +

NS(s)*NE(e) − Penalty (e,srl);
6.     else set next_score = score (s,srl) + NE(s)*NS(e) − Penalty (e,srl);
7. set next_srl = NEXT_SRL(srl);
8. if (next_score > score (e,next_srl)) then
    set score(e,next_srl) = next_score;
    set source(e,next_srl) = s;
    set start(e,next_srl) = start(s,srl);

In this embodiment, the following penalty term is used, where symbol_width is the width of a barcode symbol in pixels:

$$Penalty(x, i) = \left(x - start(x, i) - symbolwidth \times \frac{(i+1)}{N}\right)^2$$

Then the result series of bar starts and ends, the vector X, is constructed as follows:

9. srl is set to the symbol relative location of the last bar in the expected barcode, K mod N.
10. The minimal e is found such the score(e,srl) is maximized X(K) is set to e.
11. For i from K −1 down to 1 the following steps are repeated:
12.     X(i) is set to Source(X(i+1),srl);
13.     srl is set to PREV_SRL(srl).

If at the end of this process NEXT_SRL(srl) is not equal to 0 then the process has failed because the last calculated element is the first in the barcode, so its srl should be 0.

The vector X is then decoded in step 230 in a known manner to identify the character sequence associated with the barcode according to the prevailing barcode standard and generate, for example an ASCII coded character sequence for processing by workstation 160.

I claim:

1. Apparatus for producing a coded representation of a barcode, for use in barcode recognition, from an image of the barcode in form of an array comprising rows and columns of pixels stored in digital form by determining a series of bar start and bar end locations from the image, comprising:

means for determining for each column of pixels in said image number (NS, NE) of rows of pixels in the image in which runs of black or white pixels start or end at said column; and optimization logic for selecting the bar start and bar end locations for series by finding an extremum in a predefined target function, the target function being a function of said number (NS, NE) of rows of pixels in the image in which runs of black or white pixels start or end at each column, thereby optimizing agreement on the location of the bar starts and ends between all of the rows in the image.

2. Apparatus as claimed in claim 1 in which the optimization logic tests only combinations of start and end locations which are consistent with a predefined barcode definition.

3. Apparatus as claimed in claim 1 wherein the optimization logic is arranged to find a best path between nodes, the nodes being pairs:

<pixel_location x, symbol_relative_location srl> and wherein paths can be extended from a node <l1,s1> only to nodes <l2,s2> such that l2−l1 is greater than or equal to the minimum bar length and l2−l1 is less than or equal to the maximum bar length and s2 is equal to (s1+1) mod N, where N is the number of bar/space elements per symbol in a prevailing barcode definition and srl is the location of a bar or a space relative to the start of a symbol, measured in the number of bar/space elements.

4. Apparatus as claimed in claim 1 wherein the optimization logic is arranged to operate according to a dynamic programming algorithm.

5. Apparatus as claimed in claim 1 in which the target function includes a penalty term for modifying value of the target function according to a distance of a postulated symbol start or end location and an expected symbol start or end location, derived from a predefined barcode definition.

6. Method for producing a coded representation of a barcode from an image of the barcode in form of an array of pixels stored in digital form, the method comprising determining a series of bar start and bar end row locations from the image, comprising steps of:

determining for each column of pixels in said image a number (NS, NE) of rows of pixels in the image in which runs of black or white pixels start or end at said column; and selecting the bar start and bar end locations for a series by finding an extremum in a predefined target function, the target function being a function of the number (NS, NE) of rows of pixels in the image in which runs of black or white pixels start or end at each column, thereby optimizing agreement on the location of the bar starts and ends between all of the rows in the image.

7. Method of claim 6 wherein the determining step further comprises the step of:

testing only those combinations of start and end locations which are consistent with a predefined barcode definition.

8. Method of claim 6 wherein the selecting step finds a best path between nodes, the nodes being pairs:

<pixel_location x, symbol_relative_location srl> and wherein paths can be extended from a node <l1,s1> only to nodes <l2,s2> such that l2−l1 is greater than or equal to the minimum bar length and l2−l1 is less than or equal to the maximum bar length and s2 is equal to (s1+1) mod N, where N is the number of bar/space elements per symbol in a prevailing barcode definition and srl is the location of a bar or a space relative to the start of a symbol, measured in the number of bar/space elements.

9. Method of claim 6 in which the target function of the selecting step includes a penalty term and the selecting step further comprises:

modifying a value of the target function according to a distance of a postulated symbol start or end location and an expected symbol start or end location, derived from a predefined barcode definition.

10. Apparatus for producing a coded representation of a barcode from an image of the barcode in form of an array comprising rows and columns of pixels stored in digital form comprising:

means for determining for each row of the array of pixels, a series of bar start and bar end column locations from the array;

means for determining for each column of the array, a number NS of rows of pixels in the array in which runs of pixels representing a bar start, and the number NE of rows in the array in which runs of pixels representing a bar end; and optimization logic for selecting the bar start and bar end column locations for the series by finding an extremum in a predefined target function, the target function being a function of the number NS of rows of pixels in the array in which runs of pixels representing bars start and the number NE of rows of pixels in the array in which runs of pixels representing bars end at each column, thereby optimizing agreement on the column location of the bar starts and bar ends between all the rows in the array.

11. Apparatus as claimed in claim 10 in which the optimization logic tests only those combinations of start and end locations which are consistent with a predefined barcode definition.

12. Apparatus as claimed in claim 10 wherein the optimization logic finds a best path between nodes, the nodes being pairs:

<pixel_location x, symbol_relative_location srl> and wherein paths can be extended from a node <l1,s1> only to nodes <l2,s2> such that l2−l1 is greater than or equal to the minimum bar length and l2−l1 is less than or equal to the maximum bar length and s2 is equal to (s1+1) mod N, where N is the number of bar/space elements per symbol in a prevailing barcode definition and srl is the location of a bar or a space relative to the start of a symbol, measured in the number of bar/space elements.

13. Apparatus as claimed in claim 10 wherein the optimization logic is arranged to operate according to a dynamic programming algorithm.

14. Apparatus as claimed in claim 10 in which the target function includes a penalty term for modifying a value of the target function according to a distance of a postulated symbol start or end location and an expected symbol start or end location, derived from a predefined barcode definition.

\* \* \* \* \*